US010532490B2

(12) United States Patent
Christiano

(10) Patent No.: US 10,532,490 B2
(45) Date of Patent: Jan. 14, 2020

(54) PLASTICATING APPARATUS SCREW HAVING GROOVES OF VARYING ANGLES AND DEPTHS

(71) Applicant: Davis-Standard, LLC, Pawcatuck, CT (US)

(72) Inventor: John P. Christiano, Old Lyme, CT (US)

(73) Assignee: Davis-Standard, LLC, Pawcatuck, CT (US)

( * ) Notice: Subject to any disclaimer, the term of this patent is extended or adjusted under 35 U.S.C. 154(b) by 651 days.

(21) Appl. No.: 15/091,802

(22) Filed: Apr. 6, 2016

(65) Prior Publication Data
US 2017/0291326 A1 Oct. 12, 2017

(51) Int. Cl.
*B29B 7/42* (2006.01)
*B29C 48/53* (2019.01)
*B29C 48/535* (2019.01)
*B29C 48/59* (2019.01)
*B29C 48/655* (2019.01)

(52) U.S. Cl.
CPC .............. *B29B 7/429* (2013.01); *B29C 48/53* (2019.02); *B29C 48/535* (2019.02); *B29C 48/59* (2019.02); *B29C 48/655* (2019.02)

(58) Field of Classification Search
CPC ....... B29C 48/53; B29C 48/535; B29C 48/56; B29C 48/59; B29C 48/64; B29C 48/655; B29C 48/03; B29C 48/397; B29C 48/505; B29C 48/67; B29C 48/832
See application file for complete search history.

(56) References Cited

U.S. PATENT DOCUMENTS

| 3,524,222 A | * | 8/1970 | Street | B29C 48/505 425/203 |
| 4,639,143 A | | 1/1987 | Frankland, Jr. | |
| 4,752,136 A | * | 6/1988 | Colby | B29C 45/60 366/89 |
| 5,215,764 A | * | 6/1993 | Davis | B29C 45/60 425/208 |
| 5,318,358 A | * | 6/1994 | Wobbe | B29B 7/489 366/85 |
| 5,816,698 A | * | 10/1998 | Durina | B29B 7/421 366/81 |

(Continued)

FOREIGN PATENT DOCUMENTS

| EP | 3228435 | * 10/2017 |
| FR | 2483319 A1 | 12/1981 |

OTHER PUBLICATIONS

Partial European Search Report for corresponding EP17165071 dated Sep. 14, 2017.

*Primary Examiner* — Tony G Soohoo
(74) *Attorney, Agent, or Firm* — Murtha Cullina LLP

(57) ABSTRACT

A screw for a plasticating apparatus has one or more helical flights. A portion of the screw has a plurality of advancing grooves arranged in a noncontinuous helix cut in the screw. The advancing grooves are dimensioned to receive material therein as the material is conveyed through the barrel. The screw has a plurality of noncontinuous cross-cut grooves traversing one or more of the advancing grooves. The cross-cut grooves have a second helix angle greater than the first helix angle and less than ninety degrees; and/or one or more of the cross-cut grooves have a third helix angle of about ninety degrees.

11 Claims, 15 Drawing Sheets

(56) References Cited

U.S. PATENT DOCUMENTS

| | | | | |
|---|---|---|---|---|
| 5,961,209 | A * | 10/1999 | Kovacevic | B29C 45/60 366/89 |
| 6,488,399 | B1 * | 12/2002 | Womer | B29B 7/429 366/81 |
| 6,497,508 | B1 * | 12/2002 | Womer | B29B 7/421 366/81 |
| 6,498,399 | B2 | 12/2002 | Chung et al. | |
| 6,547,431 | B1 * | 4/2003 | Womer | B29C 48/64 366/81 |
| 7,387,426 | B2 * | 6/2008 | Kuhman | B29C 48/505 366/81 |
| 9,764,496 | B2 * | 9/2017 | Williams | B29B 7/482 |
| 2007/0104022 | A1 | 5/2007 | Kuhman | |

* cited by examiner

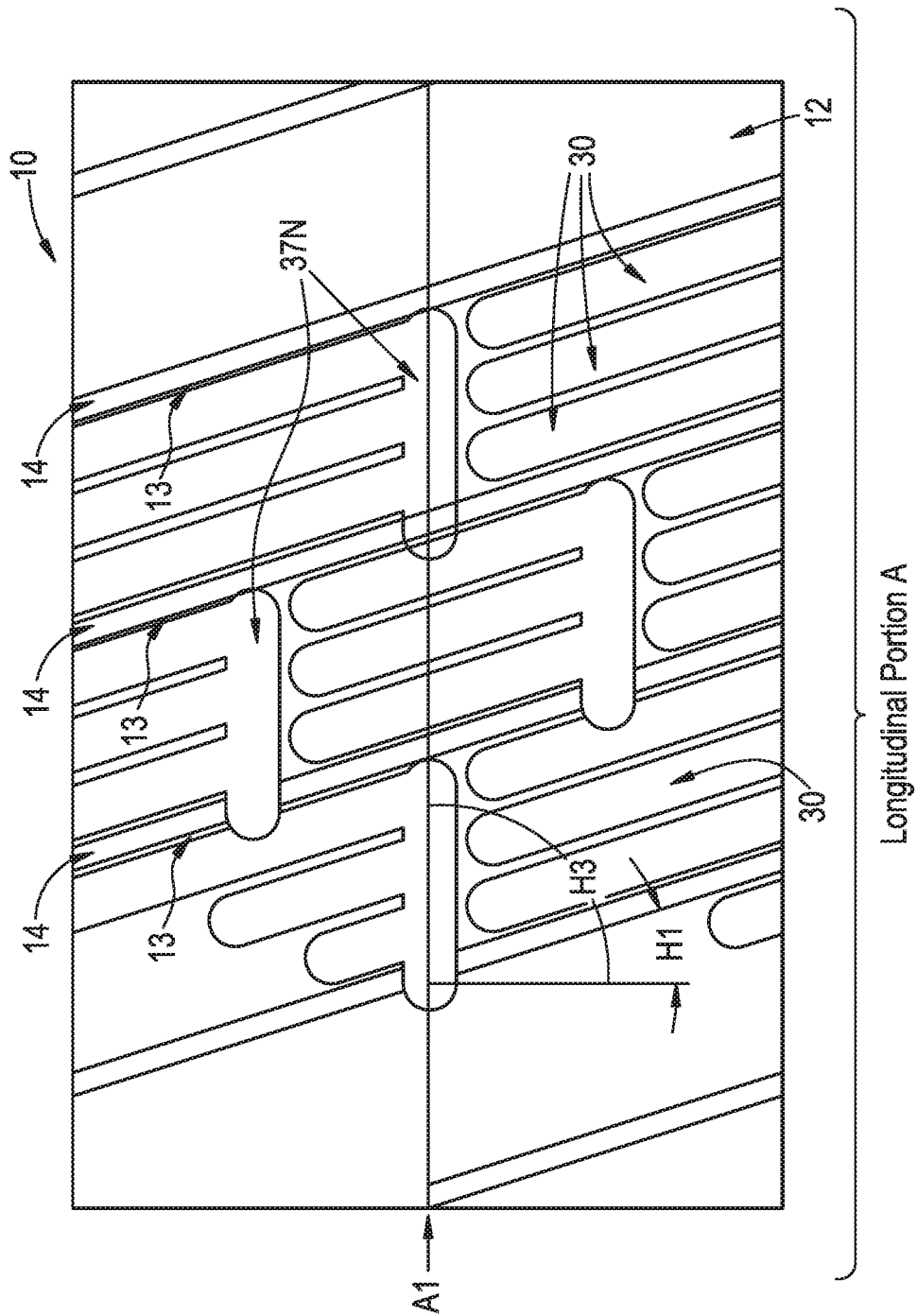

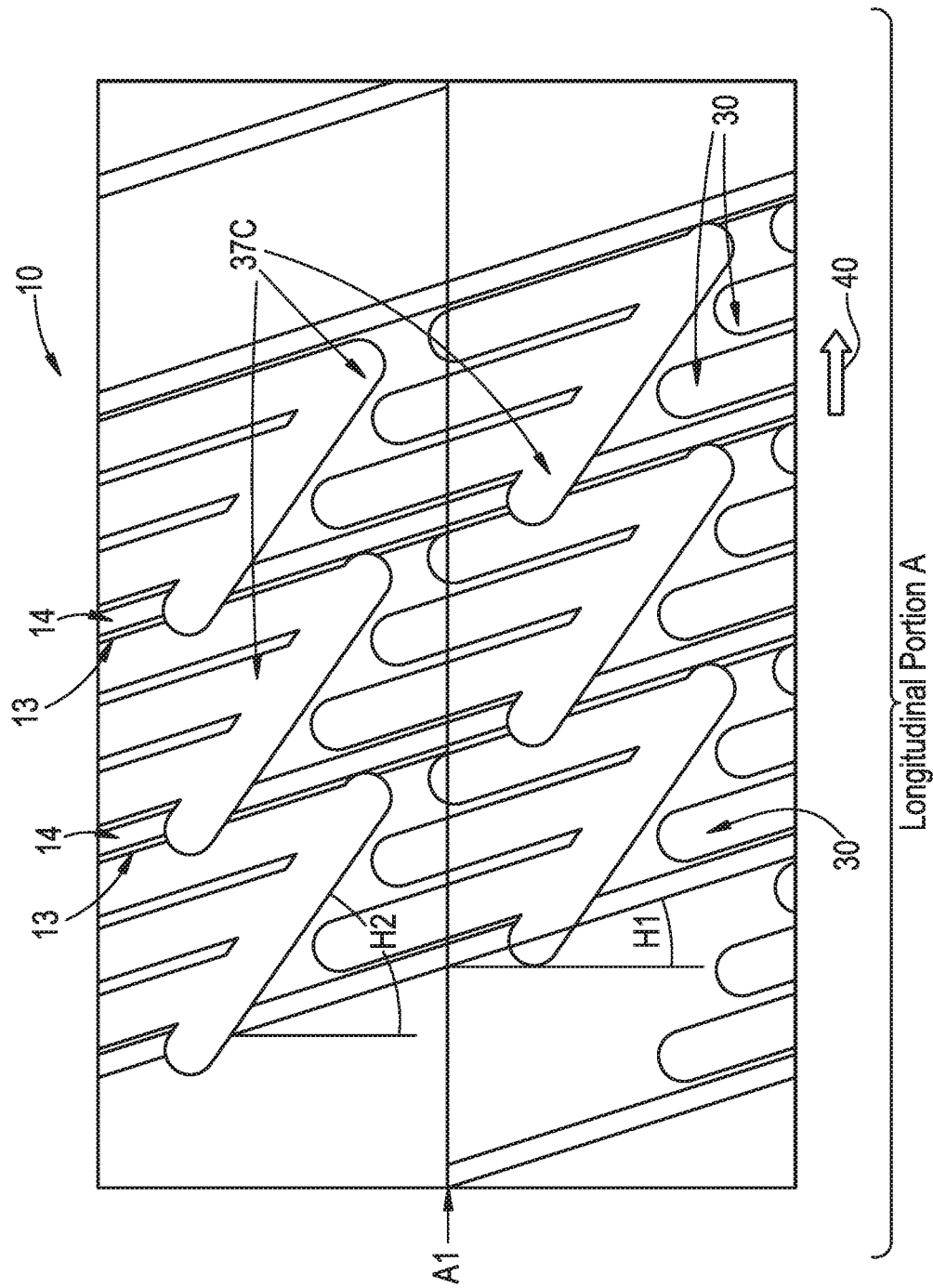

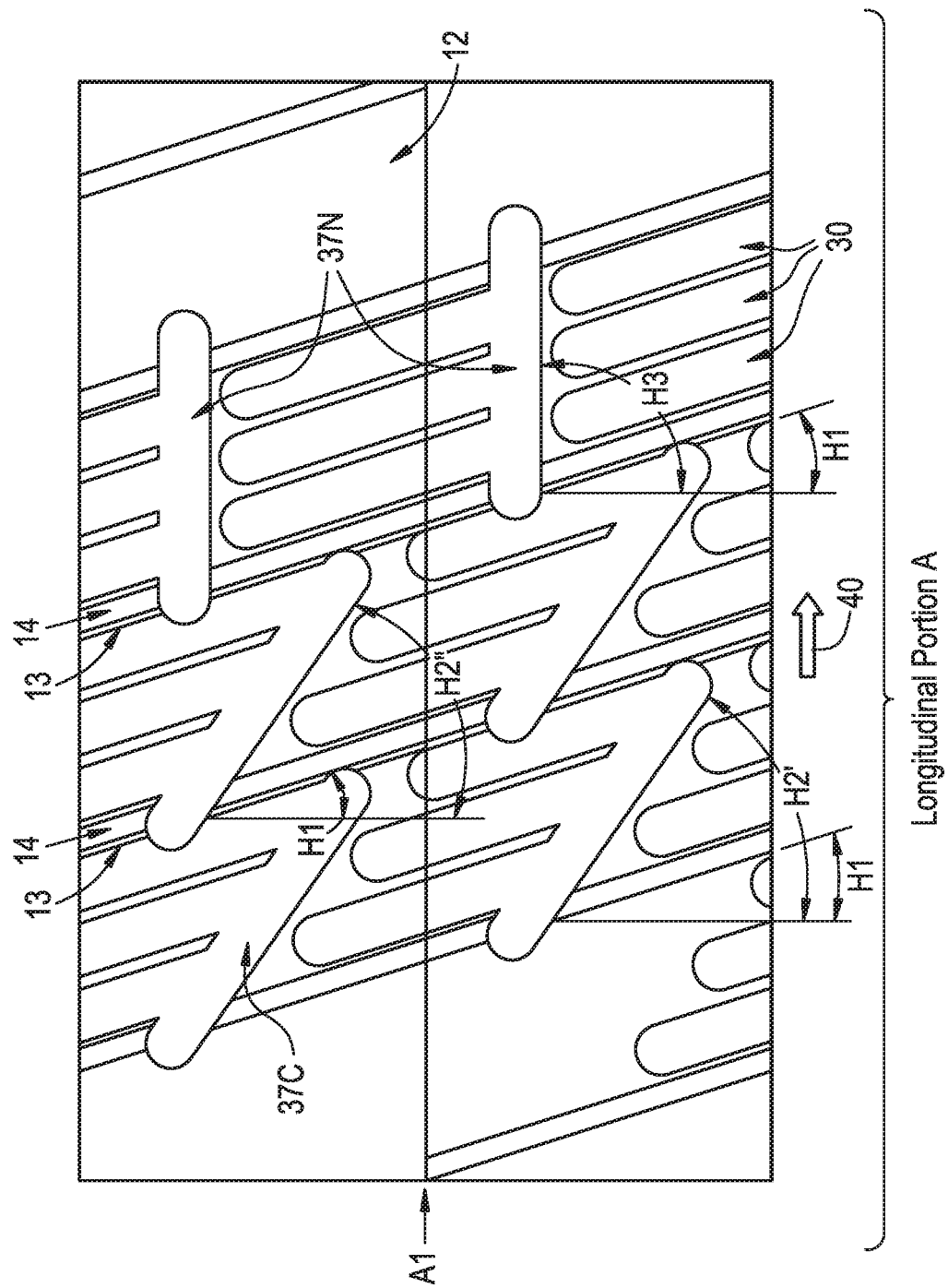

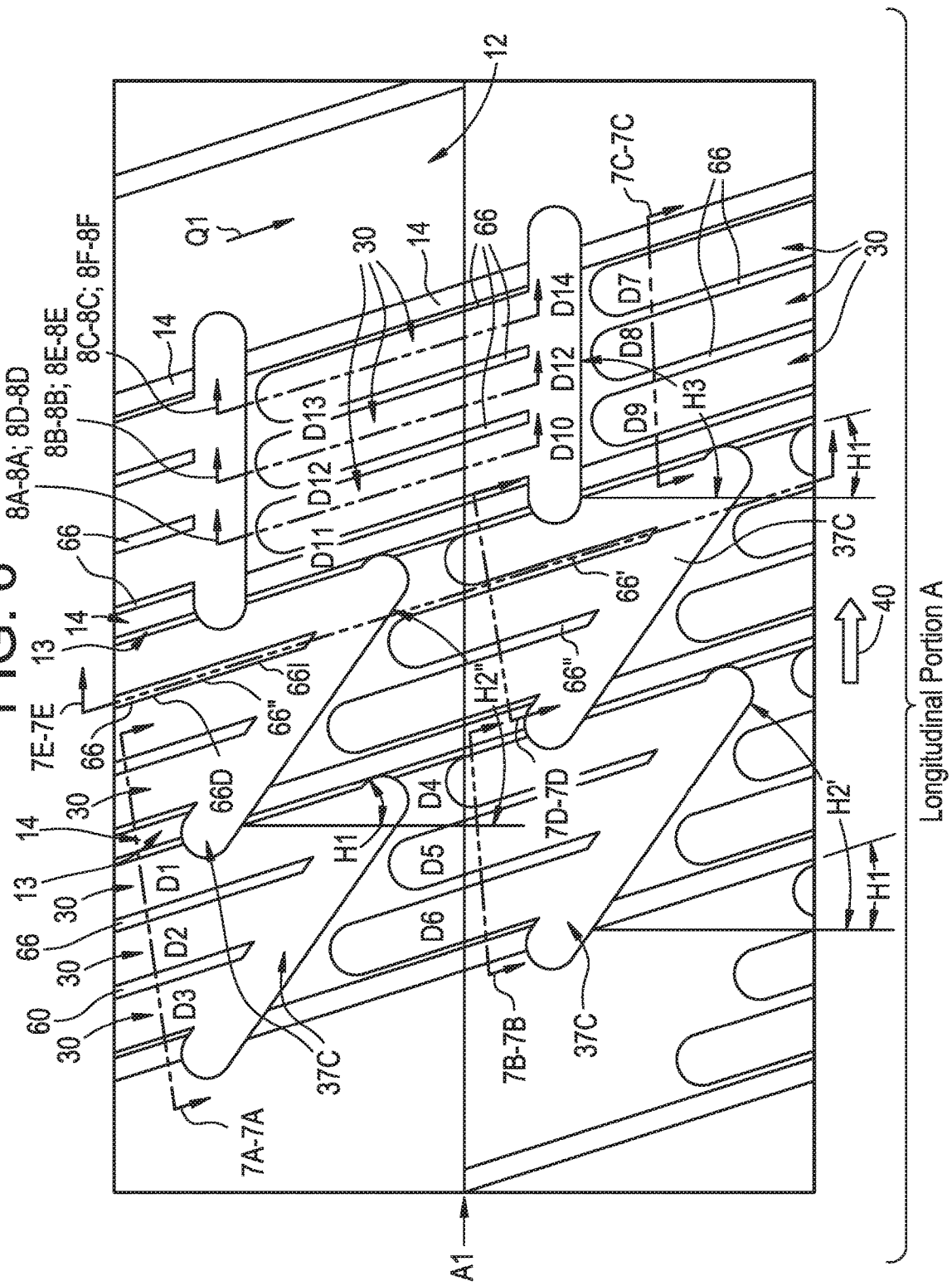

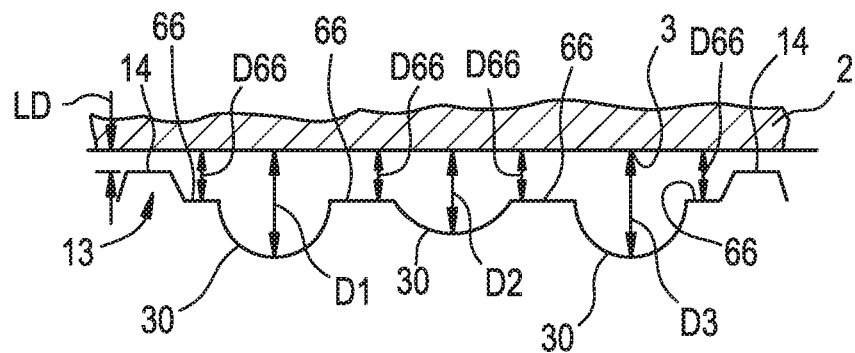
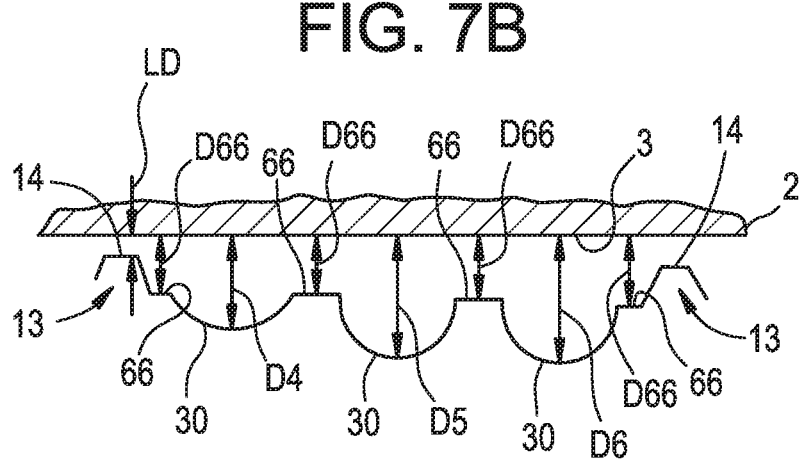
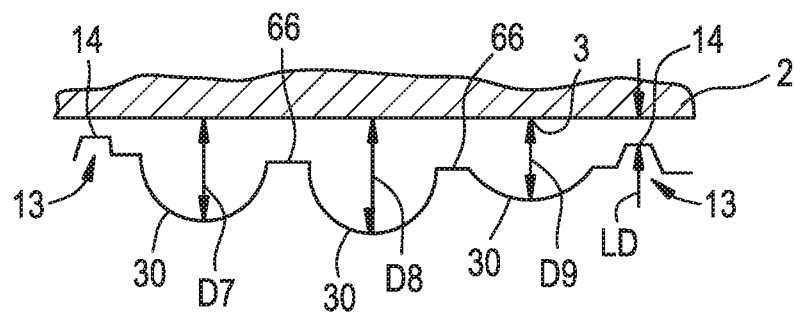

//PLASTICATING APPARATUS SCREW HAVING GROOVES OF VARYING ANGLES AND DEPTHS

FIELD

This invention relates to a plasticating apparatus screw rotatable within a barrel to extrude molten resinous material. More particularly, this invention relates to a longitudinal portion of the screw designed to recirculate material for thorough mixing and melting via grooves of various angles and having various depths and depth tapers.

BACKGROUND

A plasticating apparatus typically receives polymer or thermoplastic resin pellets, granules or powders, from an inlet port, then heats and works the resin to convert it into a melted or molten state. The melt or molten material is delivered under pressure through a restricted outlet or discharge port to make the finished article. It is desirable that the molten material leaving the apparatus be completely melted and homogeneously mixed, resulting in uniform temperature, viscosity, color and composition.

A typical plasticating apparatus includes an elongated cylindrical barrel, which is usually heated at various locations along its length. An axially supported and rotating screw extends longitudinally through the barrel. The screw is responsible for forwarding, melting, pressurizing and homogenizing the material as it passes from the inlet port to the outlet port. The screw has a core with a helical flight thereon and the flight cooperates with the cylindrical inner surface of the barrel to define a helical channel for forward passage of the resin to the outlet port.

The typical plasticating screw has a plurality of sections along its longitudinal axis with each section being designed for a particular function. Ordinarily, there is a feed section, a transition section, a metering section and a mixing section in series.

As disclosed in U.S. Pat. No. 6,498,399 and illustrated in FIG. 1 a plasticating screw 100 has a main channel defined by a helical flight 113 disposed within and cooperating with an inner-wall of a heated barrel (not shown). As illustrated in FIG. 1, the prior art screw 100 has a longitudinal portion with a plurality of staggered rows of noncontinuous advancing grooves 130 arranged in the main channel thereof. The axis of each row of advancing grooves 130 is substantially parallel to the helical axis of the adjacent helical flight 113 of the longitudinal portion to promote flow in the direction indicated by the arrow 140. A noncontinuous helical channel is formed therein traversing in a reverse direction, compared with the direction of the helical flight 113, the channel having a plurality of retracting grooves 137. While the objective of the retracting grooves 137 is to promote mixing of the polymer or thermoplastic resin pellets in the main channel, in some instances mixing is insufficient.

Based on the foregoing, it is the general object of this invention to provide a screw configured for improved mixing of the polymer or thermoplastic resin pellets.

SUMMARY

The present invention resides in one aspect in a screw for a plasticating apparatus. The plasticating apparatus includes a barrel that has an axial length extending between an inlet port and an outlet port. The barrel has an inner wall. The screw has a longitudinal axis and is rotatably supported in the barrel for rotation about the longitudinal axis. The screw has a core and one or more helical flights extending along a length of the screw. The helical flight extends in a first threaded direction and defines a first helix angle relative to a reference line perpendicular to the longitudinal axis and defines a first helical path oriented at the first helix angle which is less than ninety degrees. The helical flight defines a helical channel. The screw may include a feed section cooperating with the inlet port, an intermediate melt section, and/or a metering section cooperating with said outlet port. A longitudinal portion of the screw (e.g., in the feed section, the intermediate melt section, and/or the metering section) has a plurality of advancing grooves formed therein. Each of the advancing grooves has one or both ends closed. The advancing grooves are arranged in a noncontinuous helix cut in the screw core in the helical channel of the screw. The plurality of advancing grooves are dimensioned to receive material therein as the material is conveyed through the helical channel, to the outlet port. The longitudinal portion further has a plurality of noncontinuous cross-cut grooves traversing one or more of the advancing grooves. One or more of the cross-cut grooves has a second helix angle (measured relative to a reference line perpendicular to the longitudinal axis) greater than the first helix angle and less than ninety degrees; and/or one or more of another of the cross-cut grooves has a third helix angle (measured relative to a reference line perpendicular to the longitudinal axis) of about ninety degrees.

In one embodiment, each cross-cut groove passes through the helical flight not more than two times so that the material can back flow and recirculate within said longitudinal portion.

In one embodiment, one or more of the plurality of advancing grooves includes an advancing groove depth taper; and/or one or more of the plurality of cross-cut grooves having a cross-cut groove depth taper.

The present invention also resides in another screw for a plasticating apparatus. The plasticating apparatus includes a barrel that has an axial length extending between an inlet port and an outlet port. The barrel has an inner wall. The screw has a longitudinal axis and is rotatably supported in the barrel for rotation about the longitudinal axis. The screw has a core and one or more helical flights extending along a length of the screw. The helical flight defines a first helix angle relative to a reference line perpendicular to the longitudinal axis and defines a first helical path oriented at the first helix angle which is less than ninety degrees. The helical flight defines a helical channel. The screw may include a feed section cooperating with the inlet port, an intermediate melt section, and/or a metering section cooperating with said outlet port. A longitudinal portion of the screw (e.g., in the feed section, the intermediate melt section, and/or the metering section) has a plurality of advancing grooves formed therein. Each of the advancing grooves has one or both ends closed. The advancing grooves are arranged in a noncontinuous helix cut in the screw core in the helical channel of the screw. The plurality of advancing grooves are dimensioned to receive material therein as the material is conveyed through the helical channel, to the outlet port. The longitudinal portion further has a plurality of noncontinuous cross-cut grooves traversing several advancing grooves. One or more of the plurality of advancing grooves has an advancing groove depth taper; and/or one or more of the plurality of cross-cut grooves has a cross-cut groove depth taper.

The present invention also resides in yet another screw for a plasticating apparatus. The plasticating apparatus includes a barrel that has an axial length extending between an inlet port and an outlet port. The barrel has an inner wall. The screw has a longitudinal axis and is rotatably supported in the barrel for rotation about the longitudinal axis. The screw has a core and one or more helical flights extending along a length of the screw. The helical flight defines a first helix angle relative to a reference line perpendicular to the longitudinal axis and defines a first helical path oriented at the first helix angle which is less than ninety degrees. The helical flight defines a helical channel. The screw may include a feed section cooperating with the inlet port, an intermediate melt section, and/or a metering section cooperating with said outlet port. A longitudinal portion of the screw (e.g., in the feed section, the intermediate melt section, and/or the metering section) has a plurality of advancing grooves formed therein. Each of the advancing grooves has one or both ends closed. The advancing grooves are arranged in a noncontinuous helix cut in the screw core in the helical channel of the screw. The plurality of advancing grooves are dimensioned to receive material therein as the material is conveyed through the helical channel, to the outlet port. The longitudinal portion further has a plurality of noncontinuous cross-cut grooves traversing one or more of the advancing grooves. The plurality of cross-cut grooves includes one or more first cross cut grooves having a second helix angle (measured relative to a reference line perpendicular to the longitudinal axis) and one or more second cross-cut grooves having a third helix angle (measured relative to a reference line perpendicular to the longitudinal axis). The first helix angle, the second helix angle and the third helix angle are different.

In one embodiment, the plasticating apparatus includes one or more third cross-cut grooves having a fourth helix angle that is different from the first helix angle, the second helix angle and the third helix angle.

The present invention also resides in still another screw for a plasticating apparatus. The plasticating apparatus includes a barrel that has an axial length extending between an inlet port and an outlet port. The barrel has an inner wall. The screw has a longitudinal axis and is rotatably supported in the barrel for rotation about the longitudinal axis. The screw has a core and one or more helical flights extending along a length of the screw. The helical flight defines a helix angle relative to a reference line perpendicular to the longitudinal axis and defines a first helical path of a first helix angle less than ninety degrees. The helical flight defines a helical channel. The screw may include a feed section cooperating with the inlet port, an intermediate melt section, and/or a metering section cooperating with said outlet port. A longitudinal portion of the screw (e.g., in the feed section, the intermediate melt section, and/or the metering section) has a plurality of advancing grooves formed therein. Each of the advancing grooves has one or both ends closed. The advancing grooves are arranged in a noncontinuous helix cut in the screw core in the helical channel of the screw. The plurality of advancing grooves are dimensioned to receive material therein as the material is conveyed through the helical channel, to the outlet port. The longitudinal portion further has one or more undercut surfaces located radially inwardly from the flight surface. The undercut surface has a depth that varies in a longitudinal direction parallel to the advancing grooves; and/or in a direction traverse to the longitudinal direction.

BRIEF DESCRIPTION OF THE DRAWINGS

FIG. 3 is a schematic view of a portion of the surface of a screw for a plasticating apparatus of the present invention illustrating neutrally oriented cross-cut grooves on the screw;

FIG. 4A is a schematic view of a portion of the surface of a screw for a plasticating apparatus of the present invention illustrating cross-cut grooves on the screw oriented in a common direction to the flight of the screw and each cross-cut groove cutting through one flight;

FIG. 5 is a schematic view of a portion of the surface of a screw for a plasticating apparatus of the present invention illustrating a combination of neutrally oriented cross-cut grooves and cross-cut grooves oriented in a multiple directions;

FIG. 6 is a schematic view of a portion of the surface of a screw for a plasticating apparatus of the present invention illustrating advancing grooves having varying depths and depth tapers;

FIG. 7A is a cross sectional view of a portion of the surface of the screw of FIG. 6 taken across line 7A-7A;

FIG. 7B is a cross sectional view of another embodiment of a portion of the surface of the screw of FIG. 6 taken across line 7B-7B;

FIG. 7C is a cross sectional view of another embodiment of a portion of the surface of the screw of FIG. 6 taken across line 7C-7C;

DETAILED DESCRIPTION

Figure 1:
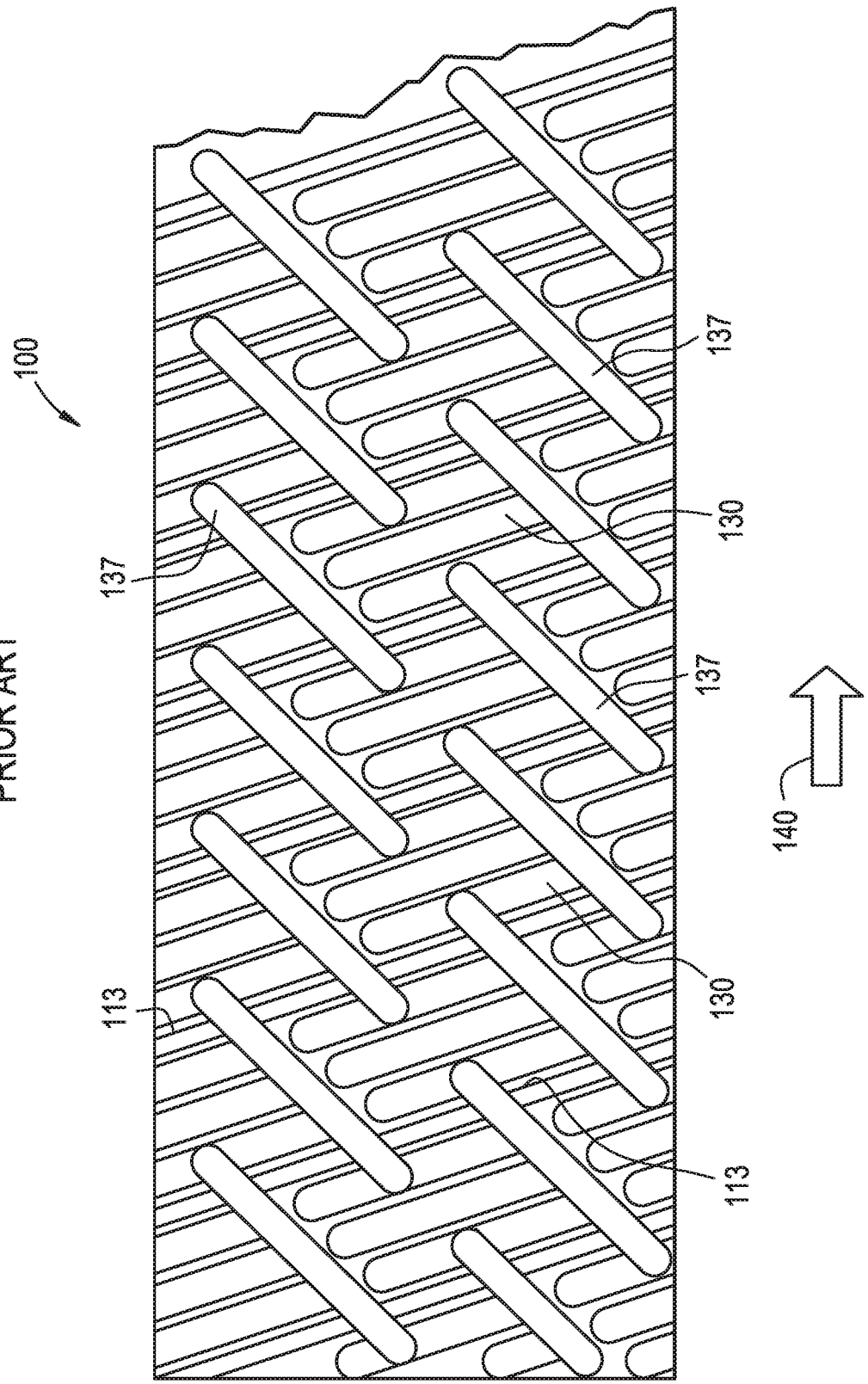
FIG. 1 is a schematic view of a portion of the surface of a prior art screw for a plasticating apparatus.
Figure 2:
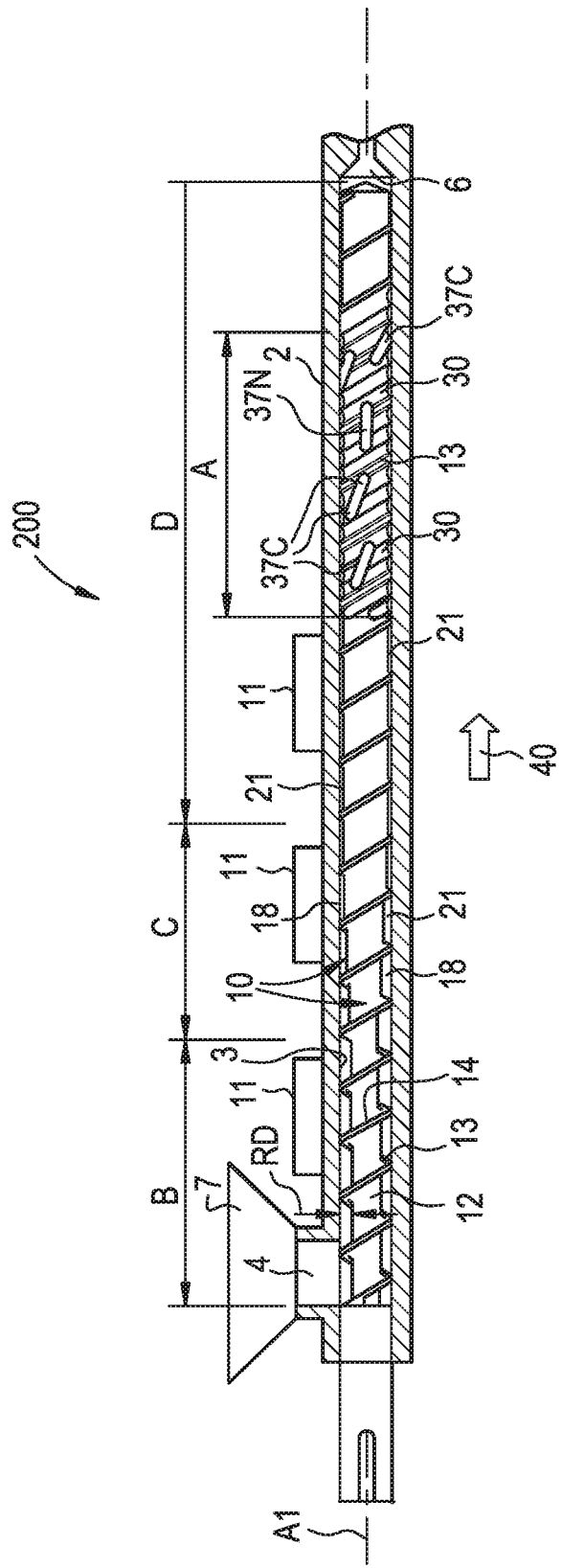
FIG. 2 is a schematic view of a screw for a plasticating apparatus of the present invention, shown in a cut away view of a barrel.

Referring to FIG. 2, a plasticating apparatus is generally designated by the numeral 200. The plasticating apparatus includes a cylindrical barrel 2 that defines an inner surface 3. The barrel 2 includes an inlet port 4 that has a feed hopper 7 connected thereto. The feed hopper 7 and inlet port 4 cooperate to supply one or more solid particulate resinous materials and any additives or agents to the barrel 2. The barrel 2 includes an outlet port 6 for the discharge of plasticated molten extrudate to a mold or die (not shown). Heating elements 11 are positioned outside of the barrel 2 for applying heat to the barrel 2.

As illustrated in FIG. 2, a screw 10 is axially supported for rotation in the barrel 2 along a longitudinal axis A1. The screw 10 extends from the inlet port 4 to the outlet port 6. The screw 10 includes a helical flight 13 radially extending from and winding around a core 12 in a first direction (e.g., in a right hand threaded direction). The helical flight 13 includes a radially outermost flight surface 14 (e.g., also referred to as a flight land) which moves in close cooperative association with the inner surface 3 of the barrel 2. The helical flight 13 defines a helical channel 18 bounded by flight 13, inner surface 3 of the barrel 2 and the surface of the core 12. The depth of the helical channel 18 is measured radially from the surface of core 12 to the inner surface 3 of the barrel 2 and is referred to as the root depth RD. With the rotation of the screw 10, the helical channel 18 forces a forward flow in the direction indicated by the arrow 40 of resinous materials.

As shown in FIG. 2, the screw 10 includes a relatively deep root feed section B for the admission, heating and working of solid resin, a transition section C of reducing root depth to adapt to the reduced volume of resin due to melting and the elimination of air spaces between the solid particles, and a relatively shallow root metering section D wherein the resin is a combination of molten and un-melted material. The metering section D includes a longitudinal portion A. The inlet port 4 is typically at the rear-most part of the upstream feed section B and the outlet port 6 is the forward-most part of the downstream metering section D.

As shown in FIG. 3, the longitudinal portion A of the surface of the core 12 includes a plurality of noncontinuous advancing grooves 30. The advancing grooves 30 are arranged to make a forward helical pathway in the helical channel 18. The advancing grooves 30 are cut into the surface of core 12. There is a plurality of adjacent grooves 30 per channel, preferably three as shown, but not limited to only three. The advancing grooves 30 are generally elliptically tapered. The advancing grooves 30 are parallel to and have the same helical pitch and first helix angle H1 as the forward helical flight 13. The first helix angle H1 is measured relative to a reference line perpendicular to the longitudinal axis A1. The advancing grooves 30 facilitate the forward flow of the resinous material towards the outlet port 6.

As shown in FIG. 3, the longitudinal portion A of the surface of the core 12 includes a plurality of staggered rows of noncontinuous cross-cut grooves 37N cut into the surface of the core 12 and intercept through one flight 13. The axis of each cross-cut groove 37N is parallel to the other cross-cut grooves 37N. The cross-cut grooves 37N are oriented in a neutral direction parallel to the longitudinal axis A1 (i.e., at about ninety degrees relative to a reference line perpendicular to the longitudinal axis). The cross-cut grooves 37N facilitate mixing of the resinous material during the transport towards the outlet port 6. While the cross-cut grooves 37N are shown and described as intercepting through one flight 13, the present invention is not limited in this regard as the cross-cut grooves 37N may intercept more than one flight 13, for example, two flights 13 (e.g., both leading and trailing flight with respect to the channel 18), as shown in FIG. 4B.

Figure 4B:
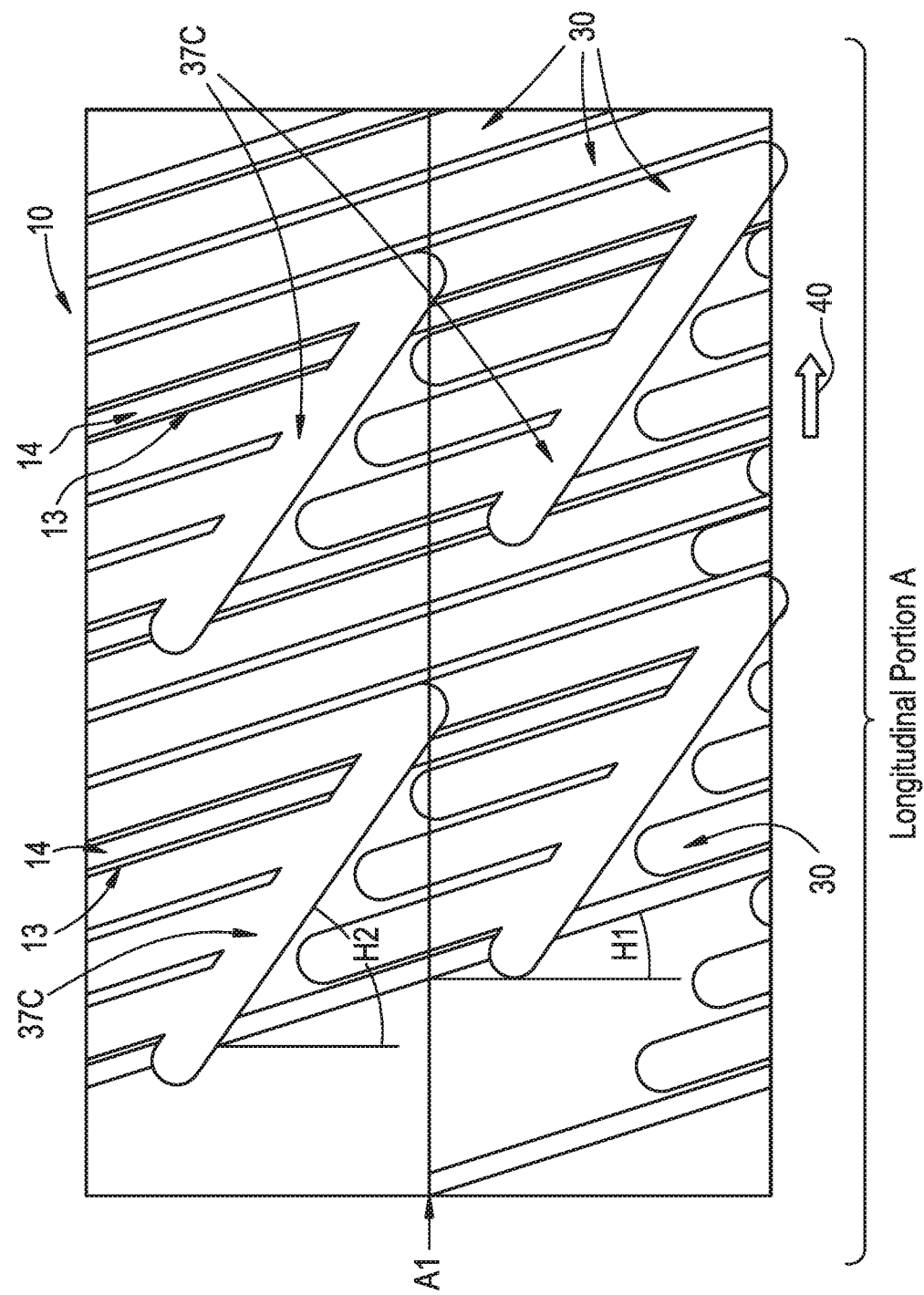
FIG. 4B is a schematic view of a portion of the surface of a screw for a plasticating apparatus of the present invention illustrating cross-cut grooves on the screw oriented in a common direction to the flight of the screw and each cross-cut groove cutting through two flights.

As shown in FIG. 4A, the longitudinal portion A of the surface of the core 12 includes has a plurality of staggered rows of noncontinuous cross-cut grooves 37C cut into the surface of the core 12 and intercept through one flight 13. The axis of each cross-cut groove 37C is parallel to the other cross-cut grooves 37C. While the cross-cut grooves 37C are shown and described as being parallel to one another, the cross-cut grooves 37C may be at different angles to one another. The cross-cut grooves 37C are oriented in the first direction common to that of the helical flight (i.e., a right hand threaded direction). The cross-cut grooves 37C are oriented at a second helix angle H2 that is different from the first helix angle H1 of the advancing grooves 30 and the helical flight 13. The second helix angle H2 shown in FIG. 4B is greater than the first helix angle H1, however in one embodiment, the second helix angle H2 may be greater than the first helix angle H1 and less than 90 degrees. The cross-cut grooves 37C facilitate mixing of the resinous material during the transport towards the outlet port 6. While the cross-cut grooves 37C are shown and described as intercepting through one flight 13, the present invention is not limited in this regard as the cross-cut grooves 37C may intercept more than one flight 13, for example, two flights 13 (e.g., both leading and trailing flight with respect to the channel 18), as shown in FIG. 4B.

As shown in FIG. 5, the longitudinal portion A of the surface of the core 12 includes has a plurality of the cross-cut grooves 37N and a plurality of the cross-cut grooves 37C cut into the surface of the core 12. Each of the plurality of cross-cut grooves 37N and each of the plurality of cross-cut grooves 37C intersect one or both flights 13. Each of the plurality of cross-cut grooves 37N is oriented at third helix angle H3 that is about 90 degrees. Some of the cross-cut grooves 37C have a second helix angle H2' and some of the cross cut grooves 37C have another second helix angle H2", wherein the second helix angle H2' is different than the other second helix angle H2". The second helix angle H2' and the other second helix angle H2" are greater than the first helix angle H1 of the flight 13. The cross-cut grooves 37N and 37C facilitate mixing of the resinous material during the transport towards the outlet port 6.

As illustrated in FIG. 6, the advancing grooves 30 have different depths and different depth tapers along a longitudinal axis of the advancing groove in a direction of flow Q1 in the advancing groove. The depths are measured from the inner surface 3 of the barrel 2 to the radially inner most point of the advancing groove 30. The different depths and different depth tapers of the advancing grooves 30 facilitate mixing of the resinous material, for example, by changing velocity distributions across the advancing groove 30. As depicted in FIGS. 2 and 4A-6, the advancing grooves 30 promote flow in the direction indicated by the arrow 40.

For example, as shown in FIG. 7A three adjacent advancing grooves 30 have different but uniform depths D1, D2 and D3, respectively. In one embodiment, D1 and D3 are greater than D2, with the advancing groove 30 with the shallow depth D2 being positioned between two advancing grooves 30 having greater depths D1 and D3. As shown in FIGS. 7A, 7B and 7C there is an undercut surface 66 that is formed (e.g., machine cut into) at a depth D66 which is greater than the land depth LD. Thus, the undercut surface 66 is located radially inwardly from the flight surface 14. The undercut surface shown in FIGS. 7A, 7B and 7C has a constant depth D66.

As shown in FIG. 7B three adjacent advancing grooves 30 have different but uniform depths D4, D5 and D6, respectively. In one embodiment, D5 and D6 are greater than D4, with the advancing groove 30 with the shallow depth D4 being positioned adjacent to the two adjacent advancing grooves 30 having greater depths D5 and D6.

As shown in FIG. 7C three adjacent advancing grooves 30 have different but uniform depths D7, D8 and D9, respectively. In one embodiment, D7 and D8 are greater than D9, with the advancing groove 30 with the shallow depth D9 being positioned adjacent to the two adjacent advancing grooves 30 having greater depths D7 and D8.

Figure 7D:
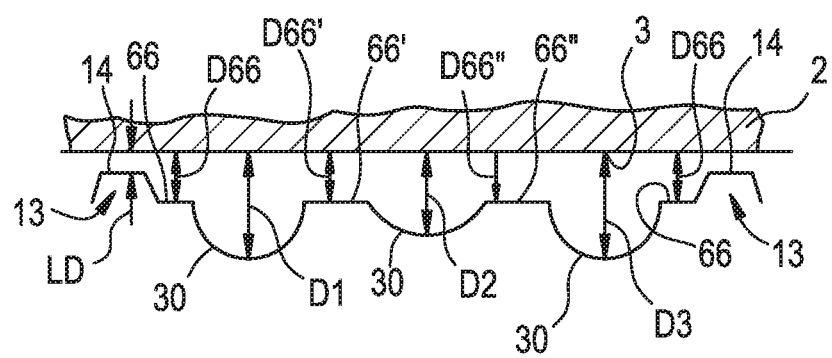
FIG. 7D is a cross sectional view of another embodiment of a portion of the surface of the screw of FIG. 6 taken across line 7D-7D.

While the undercut surface is shown in FIGS. 7A, 7B and 7C as having a constant depth D66, the present invention is not limited in this regard. For example, as illustrated in FIG. 7D the undercut surfaces have undercut groove depths that vary in a direction traverse to the longitudinal direction along the direction of flow Q1 including: 1) the undercut surfaces 66 adjacent to the flight 13 each have a depth D66; 2) the undercut surface 66' has a depth D66' that is less than the depth D66 and greater than the land depth LD; and 3) the undercut surface 66" has a depth D66" that is greater than the depth D66'. The traverse change in depths of the undercut surface 66, 66' and 66" facilitates mixing of the resinous material, for example, by changing velocity distributions across the advancing groove 30.

Figure 7E:
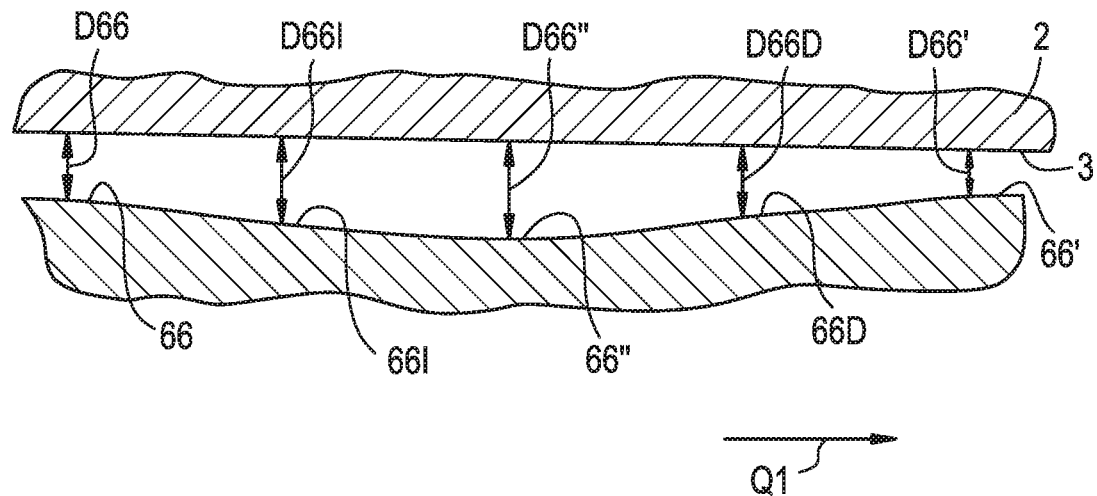
FIG. 7E is a cross sectional view of another embodiment of a portion of the surface of the screw of FIG. 6 taken across line 7E-7E.

In one embodiment, as shown in FIGS. 6 and 7E the undercut surface has a varying depth in a longitudinal direction along the direction of flow Q1, for example: 1) a portion of the undercut surface 66 has a constant depth D66; 2) another portion of the undercut surface 66D has an increasing depth taper along the longitudinal direction of flow Q1 in the advancing groove 30 wherein a portion of the increasing taper has a depth D66I that is greater than the depth D66; 3) another portion of the undercut surface 66" has a constant depth D66" that is greater than the depth D66 and the depth D66I; 4) another portion of the undercut surface 66D has a decreasing depth taper along the longitudinal direction of flow Q1 in the advancing groove 30 wherein a portion of the decreasing depth taper has a depth of D66D that is less than the depth D66"; and 5) another portion of the undercut surface 66' has a depth D66' that is less than the depth D66.

Figure 8A:
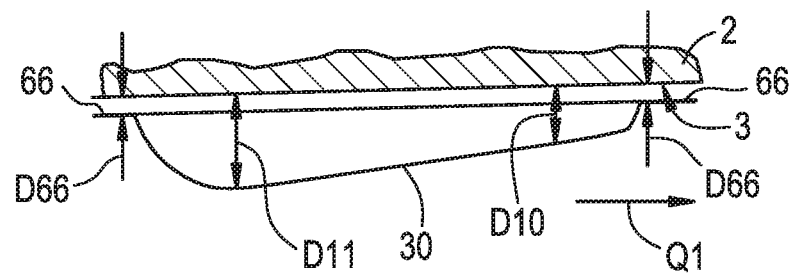
FIG. 8A is a cross sectional view of one of the advancing grooves of FIG. 6 taken across line 8A-8A showing a decreasing depth taper.
Figure 8B:
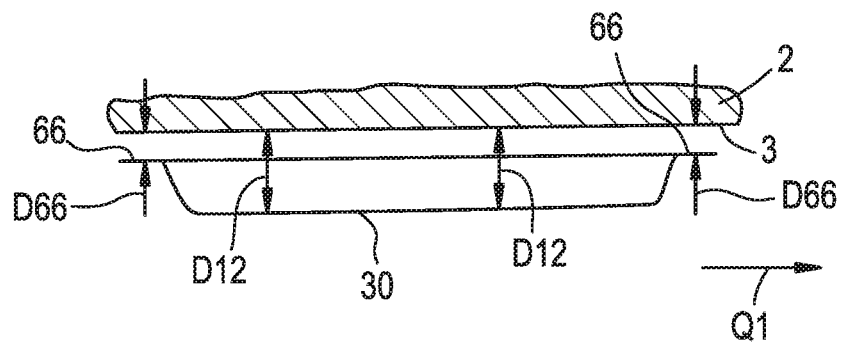
FIG. 8B is a cross sectional view of one of the advancing grooves of FIG. 6 taken across line 8B-8B showing constant depth taper.

As shown in FIG. 8A the advancing groove 30 has a decreasing depth taper in the first direction (i.e., a longitudinal direction along the advancing groove in a direction of flow though the advancing groove) as indicated by the arrow Q1. For example, the decreasing depth taper is defined by a depth D11 that is greater than a depth D10. As shown in FIG. 8B the advancing groove 30 has a constant depth taper in the first direction as indicated by the arrow Q1. For example, the constant depth taper is defined by a uniform depth D12.

Figure 8C:
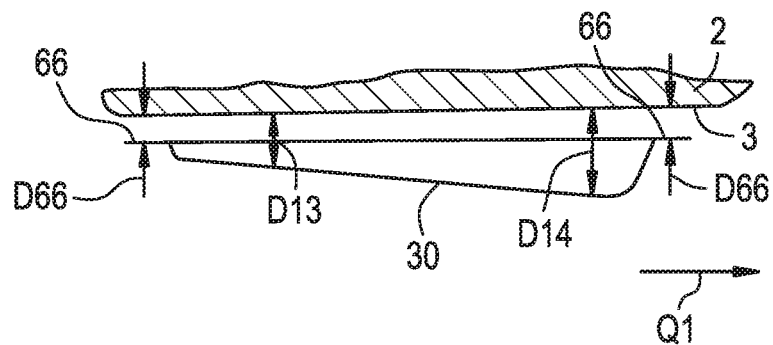
FIG. 8C is a cross sectional view of one of the advancing grooves of FIG. 6 taken across line 8C-8C showing an increasing depth taper.

As shown in FIG. 8C the advancing groove 30 has an increasing depth taper in the first direction as indicated by the arrow Q1. For example, the increasing depth taper is defined by a depth D13 that is less than a depth D14.

Figure 8D:
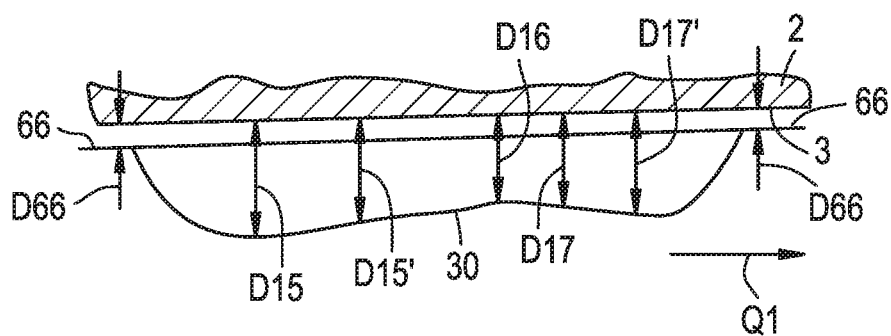
FIG. 8D is a cross sectional view of one of the advancing grooves of FIG. 6 taken across line 8D-8D showing varying depth taper.

As shown in FIG. 8D the advancing groove 30 has a varying depth taper in the first direction as indicated by the arrow Q1. For example, the varying depth taper is defined by: 1) a section of decreasing depth taper wherein a depth D15' is less than a depth D15; 2) a section of constant depth D16; 3) and a section of increasing depth taper wherein a depth D17' is greater than a depth D17.

Figure 8E:
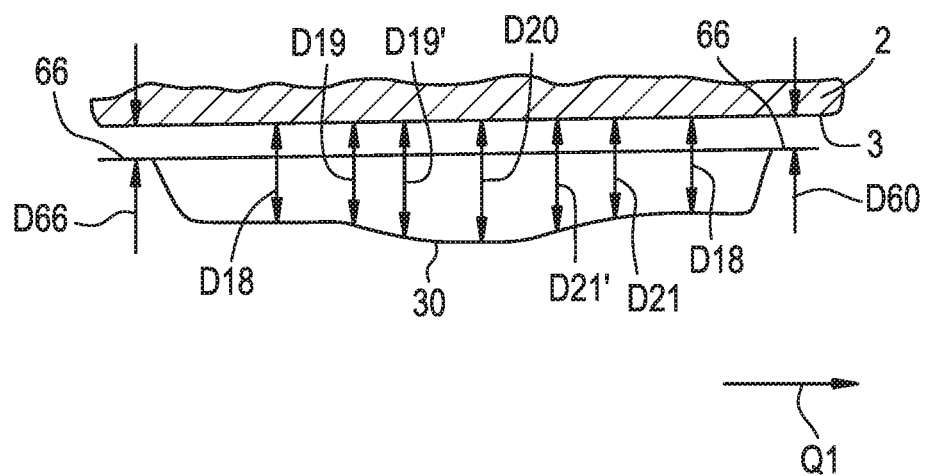
FIG. 8E is a cross sectional view of one of the advancing grooves of FIG. 6 taken across line 8E-8E showing another varying depth taper.

As shown in FIG. 8E the advancing groove 30 has varying depth taper in the first direction as indicated by the arrow Q1. For example, the varying depth taper is defined by: 1) a section of constant depth D18; 2) a section of increasing depth taper wherein a depth D19' is greater than a depth D19; 2) a section of constant depth D20; 4) a section of decreasing depth taper wherein a depth D21 is less than a depth D21'; and 5) a section of constant depth D18.

Figure 8F:
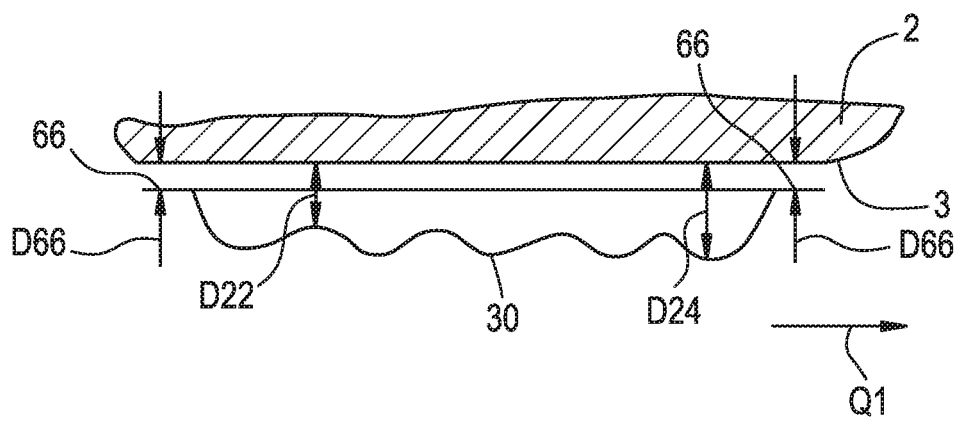
FIG. 8F is a cross sectional view of one of the advancing grooves of FIG. 6 taken across line 8F-8F showing another varying depth taper.

As shown in FIG. 8F the advancing groove 30 has a continuously varying depth D22, D24 such as a wave or sinusoidal pattern.

While the advancing grooves 30 are shown and described as having different depths and different depth tapers, the present invention is not limited in this regard as the cross-cut grooves may also or in the alternative have different depths and different depth tapers. For example, as shown in FIGS. 9, 10A, 10B, 10C, 11A, 11B, 11C, 11D, 11E, and 11F, the cross-cut grooves 37N and 37C have different depths and different depth tapers along a longitudinal axis of the cross-cut groove in a direction of flow Q3 in the cross-cut grooves 37C and in the direction of flow Q2 in the cross-cut grooves 37N. The depths are measured from the inner surface 3 of the barrel 2 to the radially inner most point of the cross-cut groove 37N or 37C. The different depths and different depth tapers of the cross-cut grooves 37N and 37C facilitates mixing of the resinous material, for example, by changing velocity distributions across the cross-cut grooves 37N and 37C.

Figure 9:
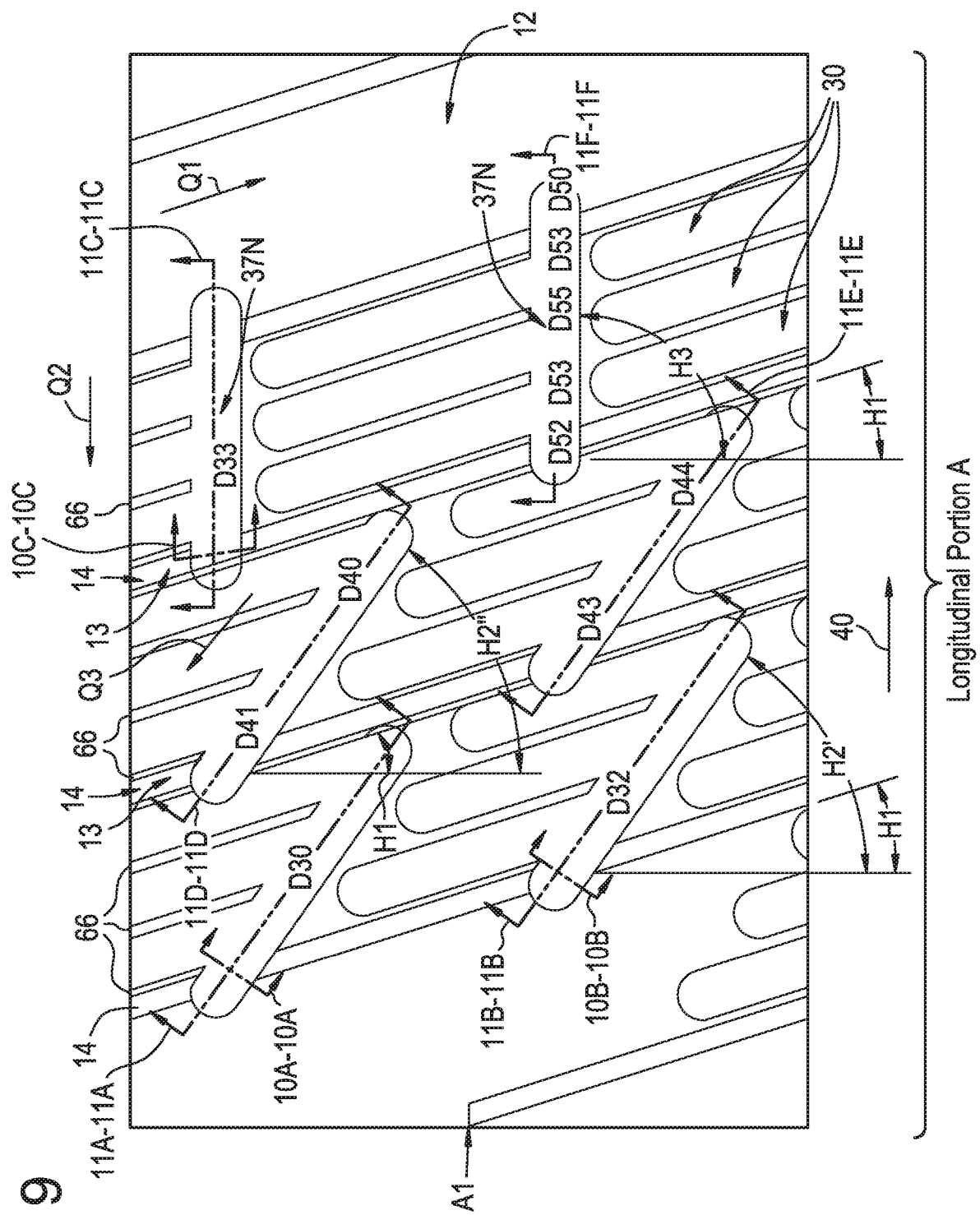
FIG. 9 is a schematic view of a portion of the surface of a screw for a plasticating apparatus of the present invention illustrating cross-cut grooves having varying depths and depth tapers.
Figure 10A:
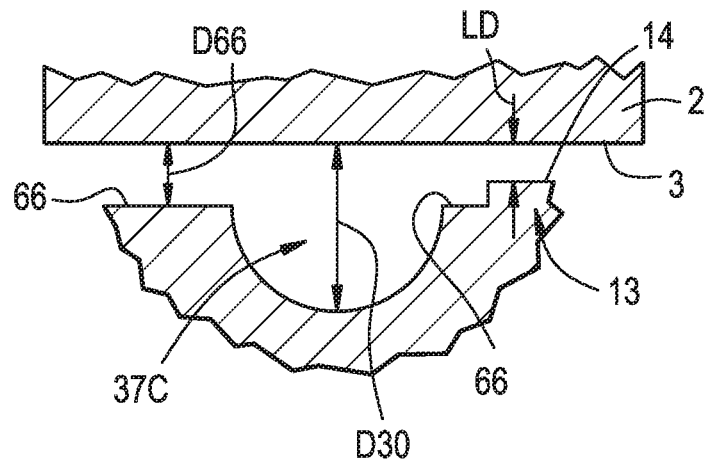
FIG. 10A is a cross sectional view of a portion of the surface of the screw of FIG. 9 taken across line 10A-10A
Figure 10B:
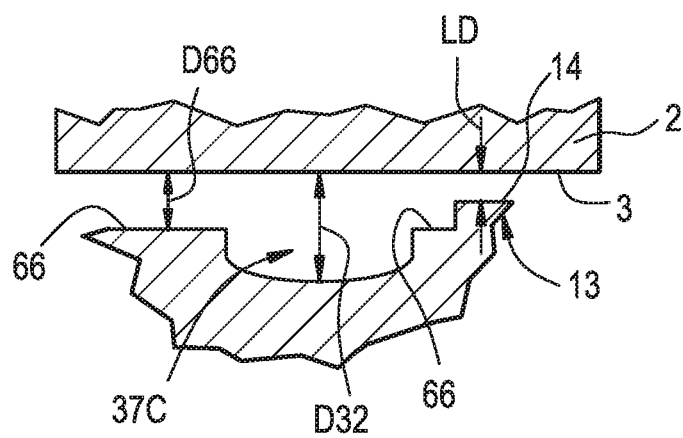
FIG. 10B is a cross sectional view of a portion of the surface of the screw of FIG. 9 taken across line 10B-10B.
Figure 10C:
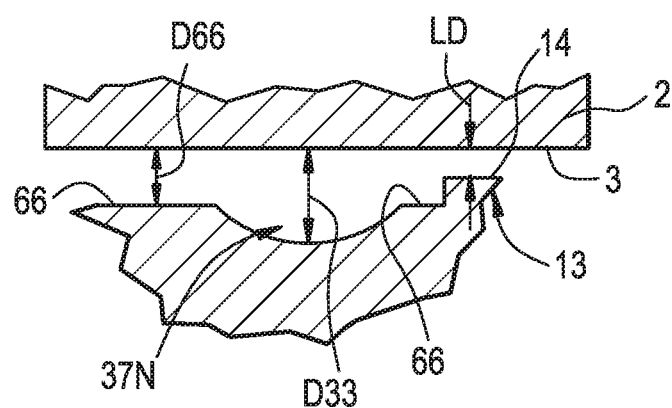
FIG. 10C is a cross sectional view of a portion of the surface of the screw of FIG. 9 taken across line 10C-10C.
Figure 11A:
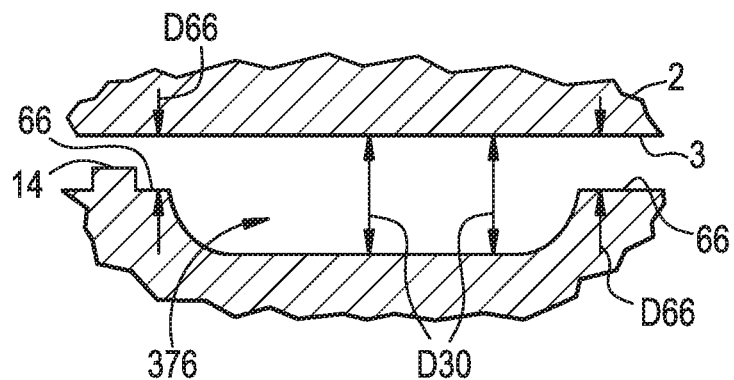
FIG. 11A is a cross sectional view of a portion of the surface of the screw of FIG. 9 taken across line 11A-11A.
Figure 11B:
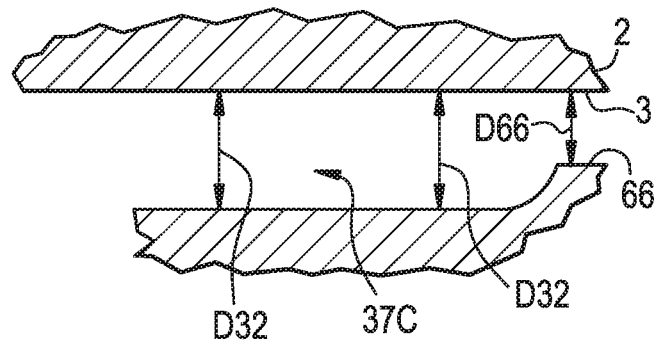
FIG. 11B is a cross sectional view of a portion of the surface of the screw of FIG. 9 taken across line 11B-11B.
Figure 11C:
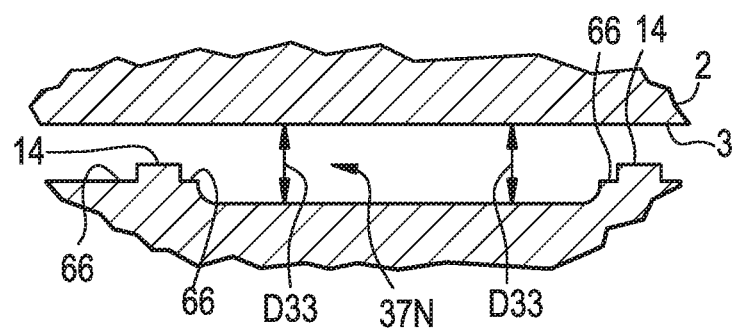
FIG. 11C is a cross sectional view of a portion of the surface of the screw of FIG. 9 taken across line 11C-11C.

As shown in FIGS. 9, 10A and 11A the cross-cut groove 37C has a constant depth D30 along the longitudinal axis of the cross-cut groove in a direction of flow Q3. As shown in FIGS. 9, 10B and 11B the cross-cut groove 37C has a constant depth D32 along the longitudinal axis of the cross-cut 37C groove in a direction of flow Q3. As shown in FIGS. 9, 10C and 11C the cross-cut groove 37N has a constant depth D33 along the longitudinal axis of the cross-cut groove in a direction of flow Q3. The depth D30 is greater than the depth D32 and the depth D32 is greater than the depth D33. Thus, the cross-cut grooves 37C and the cross-cut grooves 37N have different depths relative to other ones of the cross-cut grooves 37C and the cross-cut grooves 37N. While, the cross-cut grooves 37C and the cross-cut grooves 37N are shown and described as having different depths, the present invention is not limited in this regard as the cross-cut grooves 37C and the cross-cut grooves 37N may have equal depths or some of the cross-cut grooves 37C and the cross-cut grooves 37N may have equal depths and other of the cross-cut grooves 37 and the cross-cut grooves 37N may have different depths.

Figure 11D:
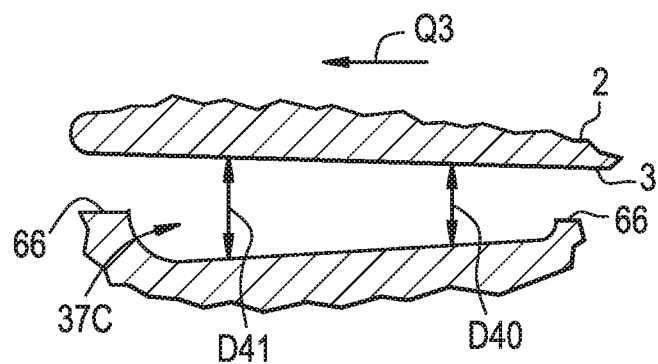
FIG. 11D is a cross sectional view of a portion of the surface of the screw of FIG. 9 taken across line 11D-11D.
Figure 11E:
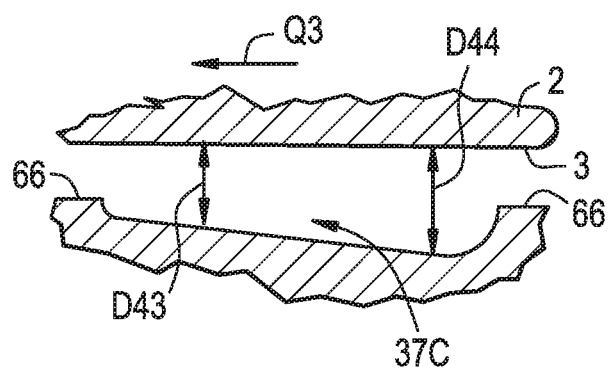
FIG. 11E is a cross sectional view of a portion of the surface of the screw of FIG. 9 taken across line 11E-11E.
Figure 11F:
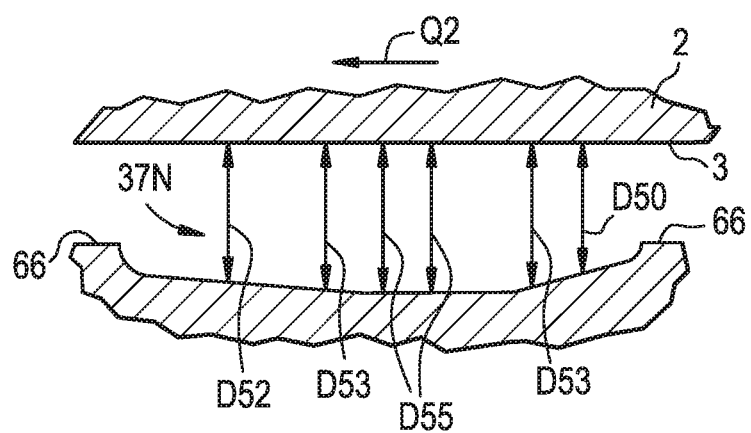
FIG. 11F is a cross sectional view of a portion of the surface of the screw of FIG. 9 taken across line 11F-11F.

As shown in FIGS. 9, 11D, 11E and 11F, the cross-cut grooves 37C and the cross-cut grooves 37N have different depth tapers. As shown in FIGS. 9 and 11D, the cross-cut groove 37C has an increasing depth taper along the longitudinal axis of the cross-cut groove 37C in a direction of flow Q3 (e.g., the cross-cut groove 37C has a depth D40 proximate one end thereof and a depth D41 proximate another end thereof, wherein the depth D41 is greater than the depth D40). As shown in FIGS. 9 and 11E, the cross-cut groove 37C has a decreasing depth taper along the longitudinal axis of the cross-cut groove 37C in a direction of flow Q3 (e.g., the cross-cut groove 37C has a depth D44 proximate one end thereof and a depth D43 proximate another end thereof, wherein the depth D44 is greater than the depth D43). As shown in FIGS. 9 and 11F, the cross-cut groove 37N has a varying depth taper along the longitudinal axis of the cross-cut groove 37C in a direction of flow Q3. For example: 1) the cross-cut groove 37N has a depth D50 proximate one end thereof and a depth D53 adjacent thereto, wherein the depth D53 is greater than the depth D50 thereby defining an increasing depth taper; 2) the cross-cut groove 37N has a constant depth D55 along a central section thereof, wherein the depth D55 is greater than the depth D53; 3) the cross-cut groove 37N has a depth D52 proximate another end thereof and a depth D53 adjacent thereto, wherein the depth D53 is greater than the depth D52 thereby defining an decreasing depth taper.

Although the invention has been described with reference to particular embodiments thereof, it will be understood by one of ordinary skill in the art, upon a reading and understanding of the foregoing disclosure that numerous variations and alterations to the disclosed embodiments will fall within the scope of this invention and of the appended claims.

What is claimed is:

1. A screw for a plasticating apparatus, the screw comprising:
    a longitudinal axis, the screw being rotatably supportable in a barrel for rotation about the longitudinal axis, the screw having a core and at least one helical flight extending along a length of the screw, the helical flight extending in a first thread direction and defining a first helical path of a first helix angle measured relative to a reference line perpendicular to the longitudinal axis, the first helix angle being less than ninety degrees, the helical flight defining a helical channel; and
    a longitudinal portion of the screw having a plurality of advancing grooves being arranged in a noncontinuous helix cut in the screw core in the helical channel of the screw, each of the polarity of advancing grooves forming a second helical path in the helical channel and being arranged entirely between adjacent helical flights and extending substantially parallel to the helical flights and extending a length between a first end and a second end, wherein at least one of the first end and the second end comprises a closed wall configured to block flow out of the advancing grooves in a direction along a second helical pat, into the crosscut groove and the plurality of advancing grooves being dimensioned to receive material therein as the material is conveyed forward through the helical channel;
    the longitudinal portion further having a plurality of noncontinuous cross-cut grooves traversing at least one advancing groove; and
    at least one of the cross-cut grooves being oriented in the first threaded direction common to that of the helical flight and having a second helix angle measured relative to the reference line perpendicular to the longitudinal axis, the second helix angle being greater than the first helix angle and less than ninety degrees.

2. The screw of claim 1, wherein each cross-cut groove passes through the helical flight not more than two times so that the material can back flow and recirculate within the longitudinal portion.

3. The screw of claim 1, wherein:
    at least one of:
        at least one of the plurality of advancing grooves comprises an advancing groove depth taper; and
        at least one of the plurality of cross-cut grooves comprises a cross-cut groove depth taper.

4. The screw of claim 3, wherein the advancing groove depth taper of the at least one of the plurality of advancing grooves is different from the advancing groove depth taper of another of the plurality of advancing grooves.

5. The screw of claim 3, wherein the cross-cut groove depth taper of at least one of the plurality of cross-cut grooves is different from the cross-cut groove depth taper of another of the plurality of cross-cut grooves.

6. The screw of claim 3, wherein the cross-cut groove depth taper of at least one of the plurality of cross-cut grooves is different from the advancing groove taper of at least one of the plurality of advancing grooves.

7. The screw of claim 3, wherein at least one of the cross-cut grooves has an increasing depth taper extending longitudinally along the cross-cut groove-in a direction of flow in the cross-cut groove.

8. The screw of claim 3, wherein at least one of the cross-cut grooves has a decreasing depth taper extending longitudinally along the cross-cut groove in a direction of flow in the cross-cut groove.

9. The screw of claim 3, wherein at least one of the advancing grooves has an increasing depth taper extending longitudinally along the advancing groove in a direction of flow in the advancing groove.

10. The screw of claim 3, wherein at least one of the advancing grooves has a decreasing depth taper extending longitudinally along the advancing groove in a direction of flow in the advancing groove.

11. The screw of claim 1, further comprising:
    at least another one of the cross-cut grooves oriented in a neutral direction and having a third helix angle measured relative to the reference line perpendicular to the longitudinal axis, the third helix angle being about ninety degrees.

* * * * *